W. C. JONES.
EYEGLASS RIM.
APPLICATION FILED APR. 30, 1914.

1,129,402.

Patented Feb. 23, 1915.

Inventor
Warren C. Jones

Witnesses
E. D. Haines.

UNITED STATES PATENT OFFICE.

WARREN COLFAX JONES, OF SAN FRANCISCO, CALIFORNIA, ASSIGNOR TO THE JONES SHARK-SKIN GRIP CO., INC., OF SAN FRANCISCO, CALIFORNIA.

EYEGLASS-RIM.

1,128,402.　　　Specification of Letters Patent.　　Patented Feb. 23, 1915.

Application filed April 30, 1914. Serial No. 835,473.

*To all whom it may concern:*

Be it known that I, WARREN COLFAX JONES, a citizen of the United States, residing at San Francisco, in the county of San Francisco and State of California, have invented certain new and useful Improvements in Eyeglass-Rims; and I do declare the following to be a full, clear, and exact description of the invention, such as will enable others skilled in the art to which it appertains to make and use the same.

My invention relates to rims for eye glasses.

The object of the invention is to provide a protective rim for eye glasses and the like which while transparent to the vision of the wearer, is colored to present an attractive appearance.

With this and other objects in view, the invention consists of certain novel features of construction, combination and arrangement of parts as will be more fully described and claimed.

Figure 1:
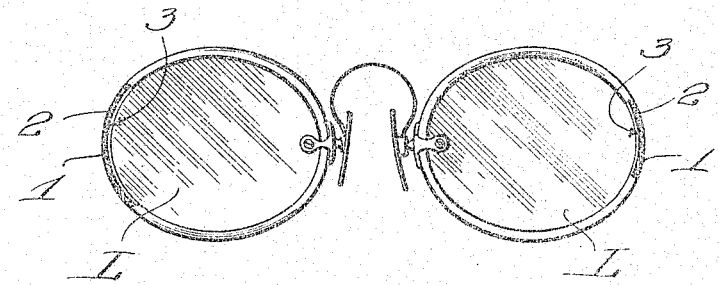
Figure 2:
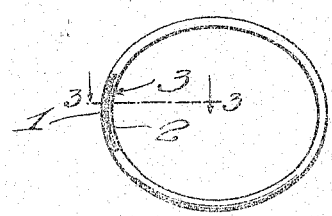
Figure 3:
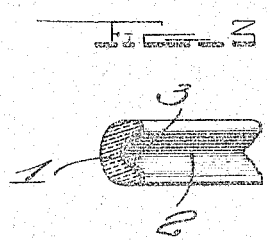

In the accompanying drawings: Figure 1 represents a front elevation of a pair of eye glasses equipped with this invention, with parts broken away and in section; Fig. 2 is a detail elevation partly in section of one rim detached; and Fig. 3 is a transverse section on an enlarged scale, of the rim, taken on line 3—3 of Fig. 2.

In the embodiment illustrated, an eye glass rim 1 of transparent celluloid is shown convexo-concave in cross section, the groove 2 thereof which receives the polished edge of the lens L, being filled with a non-fading permanent coloring stain of any desired shade as shown at 3. This stain covers a very thin surface and forms a transparent lining which being in contact with the polished edge of the lens, results in a transparent rim as viewed by the wearer's vision but is noticeably tinted to the observer, thus presenting a colored rim of pleasing appearance and finish, which does not obstruct the wearer's vision.

These rims may be tinted any desired shade to match the wearer's hair ornaments or any other article of dress desired to be matched.

I claim as my invention:

An eye glass rim composed of transparent protective material and being convexo-concave in cross section with a transparent colored lining in the apex groove thereof.

In testimony whereof I have hereunto set my hand in presence of two subscribing witnesses.

WARREN COLFAX JONES.

Witnesses:
　R. B. TREAT,
　C. McCULLOUCH.